US011121852B2

(12) United States Patent
Leveque

(10) Patent No.: US 11,121,852 B2
(45) Date of Patent: Sep. 14, 2021

(54) PARTIAL UNROLLING FOR SOFTWARE SECURITY

(71) Applicant: GEMALTO SA, Meudon (FR)

(72) Inventor: Sylvain Leveque, Gemenos (FR)

(73) Assignee: THALES DIS FRANCE SA, Meudon (FR)

(*) Notice: Subject to any disclaimer, the term of this patent is extended or adjusted under 35 U.S.C. 154(b) by 232 days.

(21) Appl. No.: 16/306,340

(22) PCT Filed: Jun. 1, 2017

(86) PCT No.: PCT/IL2017/050614
§ 371 (c)(1),
(2) Date: Nov. 30, 2018

(87) PCT Pub. No.: WO2017/208245
PCT Pub. Date: Dec. 7, 2017

(65) Prior Publication Data
US 2019/0182026 A1 Jun. 13, 2019

(30) Foreign Application Priority Data
May 31, 2016 (EP) .................................... 16305629

(51) Int. Cl.
H04L 29/06 (2006.01)
H04L 9/00 (2006.01)
H04L 9/30 (2006.01)

(52) U.S. Cl.
CPC .............. H04L 9/002 (2013.01); H04L 9/302 (2013.01); H04L 9/3066 (2013.01); H04L 2209/16 (2013.01)

(58) Field of Classification Search
CPC ....... H04L 9/002; H04L 9/302; H04L 9/3066; H04L 2209/16
See application file for complete search history.

(56) References Cited

U.S. PATENT DOCUMENTS

2006/0285682 A1* 12/2006 Sarangarajan ........ H04L 9/3066
380/28
2016/0328540 A1* 11/2016 Hoogerbrugge ...... G06F 21/602
(Continued)

OTHER PUBLICATIONS

"Chapter 3: Elliptic Curve Arithmetic ED—Darrel Hankerson; Alfred Menezes; Scott Vanstone", Jan. 1, 2004, Guide to Elliptic Curve Cryptography, Springer, pp. 75-152, XP001525413, ISBN: 978-0-387-95273-4 algorithm 3.27;; pp. 105-107.
(Continued)

Primary Examiner — Kendall Dolly
(74) Attorney, Agent, or Firm — The Jansson Firm; Pehr B. Jansson

(57) ABSTRACT

The present invention relates to a method to intrinsically protect a computer program having a driving value dedicated to handle sensitive data, said driving value comprising a plurality of N computation units to perform computations using sensitive data and susceptible to let sensitive data leak, each unit having V possible values, said method comprising a step of unrolling k parts of P units, with P>1 and P<N and N≥P*k, by rewriting them in an equivalent sequence of computations protecting the sensitive data, said unrolling step resulting in a plurality of V^P possible parts of P units, said method further comprising the step of introducing, in the finally executed computer program, instructions to dynamically execute the driving value by selecting, at end of each executed part, the next part to be executed among the possible parts.

5 Claims, 2 Drawing Sheets

(56) References Cited

U.S. PATENT DOCUMENTS

2017/0063534 A1\* 3/2017 Brown .................... G06F 7/58
2017/0063536 A1\* 3/2017 Brown ................ H04L 9/3066

OTHER PUBLICATIONS

PCT/IL2017/050614, International Search Report, dated Aug. 18, 2017, European Patent Office, P.B. 5818 Patentlaan 2 NL-2280 HV Rijswijk.

\* cited by examiner

PARTIAL UNROLLING FOR SOFTWARE SECURITY

FIELD OF THE INVENTION

The present invention relates to a method to intrinsically protect manipulation of a sensitive value by a computer program, the said value driving the handling of other sensitive data.

The invention also pertains to a computer program product obtained using said method. On a general scope, the invention concerns the security of software products implementing cryptographic algorithms, in particular those implementing RSA (STD/CRT) or ECC algorithms.

BACKGROUND OF THE INVENTION

The current trend is to implement sensitive functions, handling sensitive data, in software. Regarding cryptographic functions, this trend is designated under the terms "white-box cryptography". This addresses typically any application downloaded from an application store and running on a non-attacker safe smartphone, on an attacker-controlled smartphone, on a phone emulator or any other apparatus used for the purpose of application analysis through its execution. In such a case an attacker has full access to the behavior of the targeted software.

Software are developed using different control flow structures. A first one, the loop constituting a unit of computation/operations, iterates until an end condition is reached and we will call "driving value" the sequence of values taken by the loop iterator. Two other control flow structures, that serve similar purposes, are the so called if..then..else and switch..case ones. They aim at executing various computation units depending on the value of a condition or of a value used a selector. FIG. 1A shows a representation of a loop case as known in the prior art for the following driving value=a b a a b b a b. Lowercases are used for values taken by the driving value while caps are used to designate the actual code executed by each computation unit. Thus the number of computation unit is N=8 and the number of possible values for each unit is V=2.

If a loop is based on a secret value that the attacker must not recover, it is well known that the behavior of the loop itself leaks the secret value. The loop case is thus unsafe.

A known protection against this problem is loop unrolling. According to this technique, the loop is rewritten as an equivalent sequence of operation without leaking the secret value anymore as the sensitive value itself doesn't need to be known nor manipulated at execution time anymore. Sensitive value includes the driving value itself. Known protections are indeed available in the kind of linear code resulting from unrolled loops. These protections are not adapted to implementation in loops. Moreover unrolled loops increase the execution speed. However unrolled loops are space consuming. A loop can indeed be unrolled to gain speed at the expense of code size.

Thus unrolling has two drawbacks. The first is that, if the loop has a large number of iterations, i.e. when the driving value sequence is large, then the code size increase when unrolled is too penalizing. Second, the driving value, which defines the unrolled sequence, cannot change after compilation time as the unrolled code would have to be updated on the field.

FIG. 1B shows a fully unrolled loop case as also known in the prior art for the same driving value as on FIG. 1A. The resulting code is thus larger than a code based on loops, here N/V=4 times more, as expressed by the cumulated size of the solid boxes in each figure (2×1 computation unit in FIG. 1A, 1×8 computation units in FIG. 1B). No flexibility is thus accessible except if several fully unrolled loops are stored in the computer program which is rapidly not sustainable in terms of space.

As a conclusion, rolled loops are compact and the driving value can be modified, but are unsafe. Totally unrolled loops are safer but not space efficient and enforcing only one driving value and being thus not updatable.

Further alternative and advantageous solutions would, accordingly, be desirable in the art.

SUMMARY OF THE INVENTION

The present invention aims at providing a better tradeoff between code size increase and ability to modify the value driving the loop.

The present invention is defined, in its broadest sense, as a method to intrinsically protect a computer program having a driving value dedicated to handle sensitive data, said driving value comprising a plurality of N computation units to perform operation/computation using sensitive data and susceptible to let sensitive data leak, each unit having V possible values, said method comprising the step of unrolling k parts of P units, with $P>1$ and $P<N$ and $N \geq P*k$, by rewriting them in an equivalent sequence of operations/computations protecting the sensitive data, said unrolling step resulting in a plurality of $V^P$ possible parts of P units, said method further comprising the step of introducing, in the finally executed computer program, instructions to dynamically execute the driving value by selecting, at end of each executed part, the next part to be executed among the possible parts.

The principle of the invention is to treat the driving value by parts rather than by unit. Let us assume that the value has N units, such that $N=k \times P$. Then the value can also be seen as k parts of P units. Let us assume that a unit can take V possible values, typically a unit is a bit and $V=2$.

There are $V^P$ possible parts of P units. The invention pre-computes all possible parts of P units by unrolling the corresponding sequences and embedding them in the implementation. This point addresses the space efficiency problem of unrolling, by giving the opportunity to adjust P. The larger P is, the more possible parts there are, the more space it takes.

To process the driving value, the invention considers it by part rather than by unit. There are k parts and for each part, the corresponding pre-computed unrolled sequence is processed. This point addresses the ability to dynamically update the driving value, by modifying its parts, as all possible corresponding sequences are embedded in the implementation and thus available. This is in particular of interest in a security context where value randomization is wished and even required in some cases. The invention enables a code optimization based on a space-time tradeoff, in particular for large N where a fully unrolled loop would not meet size constraints, e.g. for RSA exponent with $N=2048$ and $V=2$.

According to an advantageous embodiment, parameters ki and Pi of the unrolled parts are built to have $N=k1 \times P1+ \ldots +ki \times Pi+ \ldots +kn \times Pn$ and the finally executed computer program thus embeds $V^{P1}+ \ldots +V^{Pi}+ \ldots +V^{Pn}$ unrolled possible parts of units to choose from when processing the $k1+ \ldots ki+ \ldots +kn$ parts.

This embodiment particularly applies to cases where N cannot be written as $k*P$. It consists in a generalization of the principle of the invention. It also offers the possibility to apply different security levels on different parts of the driving value. The parts handling sensitive data would be more distributed than for parts not handling sensitive data where the use of loops would not be harmful.

According to a specific feature, k and P are chosen taking security and available space into account.

This feature is essential when security level is previously determined for at least some parts of the driving value and/or when strong space constraints are encountered. It is in particular the case for public key algorithms, for example when manipulating the private exponent during the modular exponentiation to achieve an RSA signature.

The present invention also relates to a computer program product inherently protected according to the invention and thus comprising unrolled parts and instructions to execute a driving value using the unrolled parts.

Such a computer program as obtained with the invention presents protection for the sensitive values as handled inside each unrolled parts.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

Figure 1A:
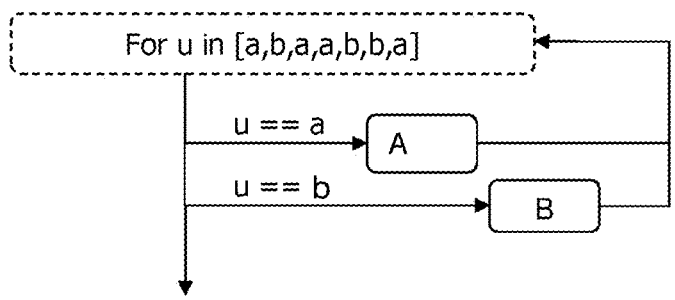
FIGS. 1A and 1B respectively show a representation of a loop case for a given driving value with conditionally executed computing units as known in the prior art and a representation of the equivalent fully unrolled loop case for the same driving value as also known in the prior art.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

Figure 1B:
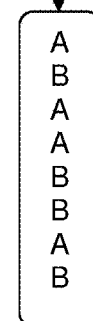
Figure 2A:
FIGS. 2A and 2B respectively show a plurality of pre-computed equivalent unrolled sequences for all possible parts of P units for the example of FIG. 1 and the processing of driving value after splitting the original computer program in parts.

FIG. 2A shows a plurality of pre-computed equivalent unrolled sequences for all possible parts of P units for the example of FIG. 1 where N=8. In the example of FIG. 2A, k=4, P=2 and V=2. All possible parts of P units are AA AB BA and BB.

Figure 2B:
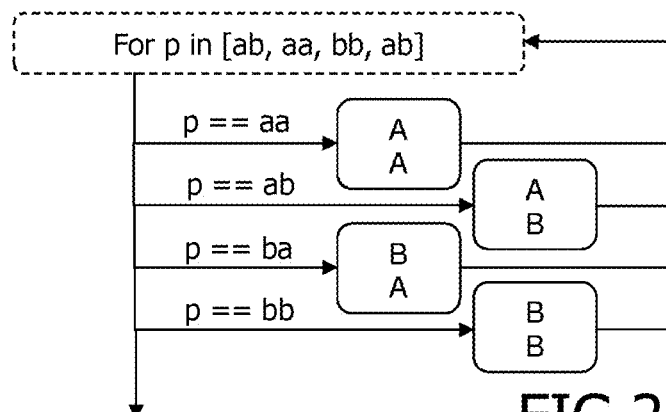

FIG. 2B illustrates the processing of driving value after splitting the original computer program in parts according to the invention. This processing is the structure of the computer program as inherently protected with the invention.

Branches of the processing as shown on FIG. 2B are consequently executed according to the value of the pair of units in the driving value.

Thus, when the computer program of the invention is executed, the second branch is first executed, then the first, then the fourth, and at last the second.

As a result the computer program of the invention comprises the four branches as unrolled and protecting inherently the sensitive value. Typically a sensitive value handled in such a way can benefit of known countermeasures at the level of the driving value on one side, using a different but functionally equivalent driving value each time, also known as exponent blinding for example in the RSA case, and at the computation unit execution level on the other side, for example by the application of code obfuscation techniques. Partial unrolling increases the obfuscation possibilities, therefore increasing the security level, compared to obfuscation applied to only one computation unit.

Figure 3A:
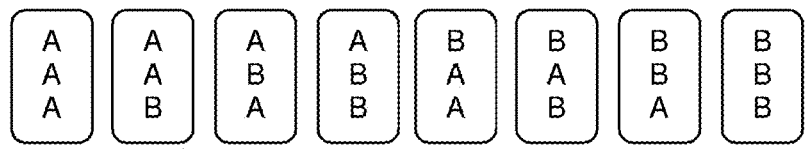
FIGS. 3A and 3B respectively show a plurality of pre-computed equivalent unrolled sequences for other possible parts of three units and the processing of driving value after splitting the original computer program in parts of three and two units.

FIG. 3A shows a plurality of pre-computed equivalent unrolled sequences for other possible parts of three units. All possible eight parts of three units are: AAA, AAB, ABA, ABB, BAA, BAB, BBA, BBB. With the invention, the computer program will comprise all these unrolled sequences which will be called according to the driving value. Such a split of the units is a design decision to be made with regards to space, speed and security constraints and illustrate the flexibility of the proposed invention.

Figure 3B:
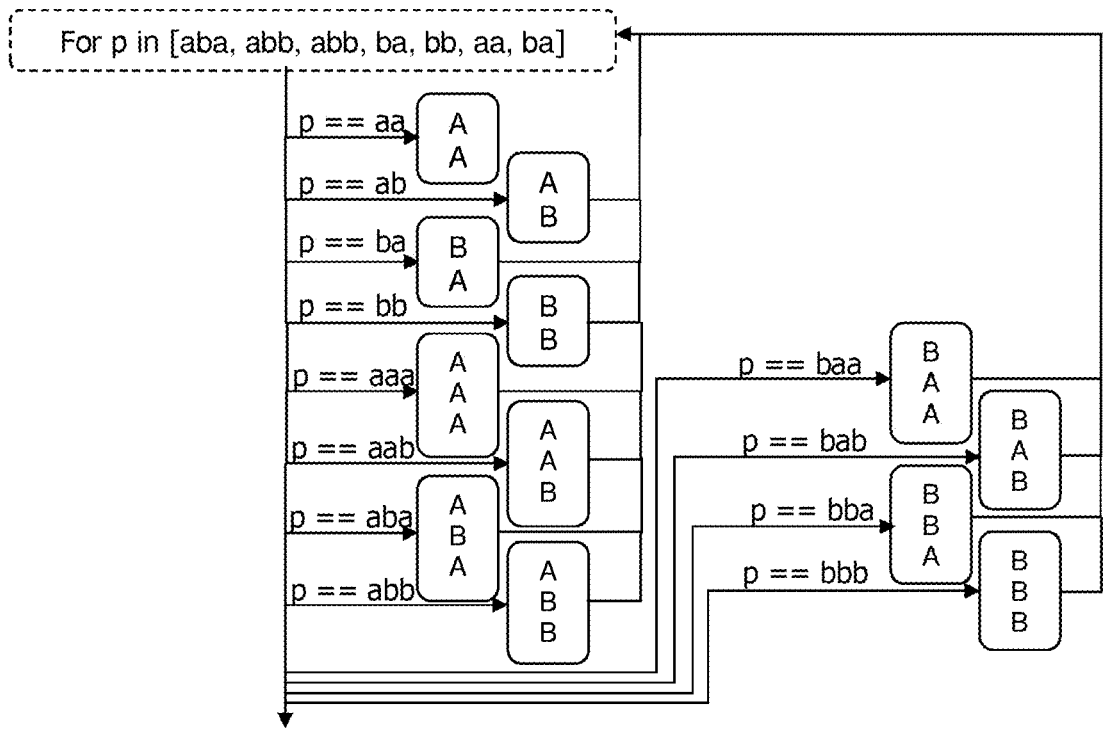

FIG. 3B shows the processing of driving value after splitting the original computer program in parts of three and two units for the following exemplary driving value: a b a a b b a b b b a b b a a b a. Here the number of units N=17 and V=2. In this example, parameters to distribute the unrolled sequences may be: k1=3, P1=3, k2=4, P2=2. Pre-computed unrolled sequences of two units are the ones of FIG. 2A.

On FIG. 3B is illustrated the processing of the driving value according to the invention. With the invention, there is no constraint on the choice and the order of the parts. In other words for p in ABA ABB ABB BA BB AA BA could also be processed as for p in AB AAB BA BBB ABB AA BA or other combinations as long as k1×P1+ . . . +ki×Pi+ . . . +kn×Pn=N and that the initial units order in the driving value is respected.

This feature increases the possibility to render any attack unfruitful as the invention enables that no group or part of loops is reiterated in successive execution of the computer program. Thus the driving value can be dynamically updated which is of particular interest when sensitive data is a secret that requires a dynamic protection. It is even possible to process a different but functionally equivalent driving value, e.g. as it would be achieved in the case of an RSA exponent blinding countermeasure.

Figure 4:
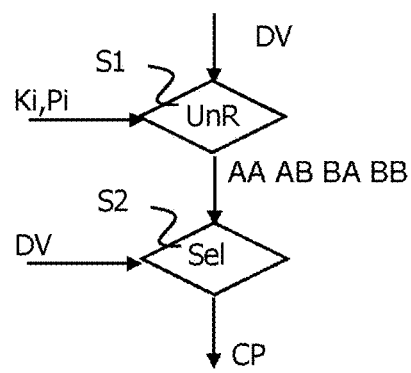
FIG. 4 shows a flowchart of the method of the invention.

FIG. 4 shows a flowchart of the method of the invention. Said method comprises a first step S1 of unrolling a driving value DV resulting in a set of possible parts AA AB BA BB of the computer program. Said unrolling is monitored using parameters ki and Pi chosen depending on the security awaited and of the available space in the device where the resulting computer program is to be stored. The method further comprises a step S2 of introducing instructions to select the succession of parts at the execution of the driving value. This step can result in a constantly identical succession of parts or, preferably, in an ever changing succession of parts. This introduces a further protection level using the invention.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to protect a computer program stored in a computerized device against leakage of sensitive data by said computerized device wherein a plurality of N computation units are executed depending on a driving value (DV), the driving value (DV) being a sequence of condition values having a length of N units, each unit having V possible values, wherein V≥2, the driving value (DV) being dedicated to handle sensitive data, each of the plurality of N computation units comprising a code to perform computations using sensitive data and susceptible to let sensitive data leak, said method comprising:

setting parameters $k_i$ and $P_i$ for each i=1, 2, ... n, where
n is the number of different lengths of parts,
$k_i$ is the number of parts having $P_i$ computation units,
$P_i \neq P_{i+1}$, $P_i > 1$ and $P_i < N$, and
$N = k_1 \times P_1 + \ldots + k_i \times P_i + \ldots + k_n \times P^{n-}$;

unrolling (S1) $k_1 + \ldots + k_i + \ldots + k_n$ parts of computation units of said computer program stored in said computerized device, by rewriting the computations into a sequence of computations units protecting the sensitive data, said unrolling step (S1) resulting in $V^{P1} + \ldots + V^{Pi} + \ldots V^{Pn}$ possible parts of computation units;

executing by said computerized device, in an executable computer program, instructions corresponding to the $V^{P1} + \ldots + V^{Pi} + \ldots V^{Pn}$ possible parts of computation units;

partitioning the driving value into $k_1 + \ldots + k_i + \ldots + k_n$ parts of units, and during execution of the computer program by said computerized device, selecting (S2) parts of computation units for execution among the $V^{P1} + \ldots + V^{Pi} + \ldots V^{Pn}$ possible parts of computation units is executed according to values of the parts of partitioned driving value;

dynamically updating the driving value by modifying the partitioning thereof while respecting its initial unit order and keeping the parameters $k_i$ and $P_i$ unchanged and selecting parts of computation units for execution among the $V^{P1} + \ldots + V^{Pi} + \ldots V^{Pn}$ possible of computation units according to the dynamically updated driving value by said computerized device.

2. The method according to claim 1, wherein $k_i$ and $P_i$ for each i=1, n are chosen taking security and available space into account.

3. A non-transitory storage comprising:
a computer program product protected against leakage of sensitive data wherein a plurality of N computation units are executed depending on a driving value (DV), the driving value (DV) being a sequence of condition values having a length of N units, each unit having V possible values, wherein V≥2, the driving value (DV) being dedicated to handle sensitive data, each of the plurality of N computation units comprising a code to perform computations using sensitive data and susceptible to let sensitive data leak, the computer program product protected by:

instructions to:
set parameters $k_i$ and $P_i$ for each i=1, 2, ... n, where
n is the number of different lengths of parts,
$k_i$ is the number of parts having $P_i$ computation units,
$P_i \neq P_{i+1}$, $P_i > 1$ and $P_i < N$, and
$N = k_1 \times P_1 + \ldots + k_i \times Pi + \ldots + k_n \times P^{n-}$;

unroll (S1) $k_1 + \ldots + k_i + \ldots + k_n$ parts of computation units of said computer program, by rewriting the computations into a sequence of computation units protecting the sensitive data, said unrolling step (S1) resulting in $V^{P1} + \ldots + V^{Pi} + \ldots V^{Pn}$ possible parts of computation units;

instructions corresponding to the $V^{P1} + \ldots + V^{Pi} + \ldots V^{Pn}$ possible parts of computation units;

instructions to partition the driving value into $k_1 + \ldots + k_i + \ldots + k_n$ parts of units, and instructions to cause the computer program, during execution of the computer program, to select (S2) parts of computation units for execution among the $V^{P1} + \ldots + V^{Pi} + \ldots V^{Pn}$ possible parts of computation units is to be executed according to the parts of the partitioned driving value; and instructions to dynamically update the driving value (DV) by modifying its parts while respecting its initial unit order and keeping ki and Pi unchanged and selecting parts of computation units for execution among the $V^{P1+\ldots+VPi} + \ldots V^{Pn}$ possible parts of computation units is to be executed according to the dynamically updated driving value.

4. The non-transitory storage, according to claim 1, wherein said computer program comprises unrolled parts and instructions to execute a driving value using the unrolled parts by selecting the branch containing the partially unrolled sequence of computation units corresponding to the value of the part and executing the selected sequence of computation units.

5. A method to protect a computer program stored in a computerized device against leakage of sensitive data by said computerized device wherein a plurality of N computation units are executed depending on a driving value (DV), the driving value (DV) being a sequence of condition values having N condition values, each condition value having V possible values, the driving value (DV) being dedicated to handle sensitive data, each of the plurality of N computation units comprising a code to perform computations using sensitive data and susceptible to let sensitive data leak, said method comprising:

unrolling a loop-case construct having V computation units of said computer program stored in said computerized device by rewriting the loop-case construct into parts that are combinations of computation units, each part having a length greater than one and less than N and wherein each part is one of a set of possible sequences of computation units having the same length as the corresponding each part, respectively;

executing by said computerized device, in a executable computer program, instructions corresponding to each possible combination of computation units of lengths corresponding to the lengths of the parts of the unrolled sequence;

partitioning the driving value into sub-sequences of condition values having lengths corresponding to the lengths of said computation unit sequences;

processing the partitioned driving value by, for each sub-sequence thereof, executing the corresponding computation unit combination in the executable computer program; and dynamically updating the driving value by modifying the partitioning of the driving value into sub-sequences while respecting the original condition value sequence and processing the dynamically updated driving value by, for each sub-sequence thereof, executing the corresponding computation unit combination in the executable computer program by said computerized device.

* * * * *